United States Patent [19]

Grecco et al.

[11] Patent Number: 5,719,919
[45] Date of Patent: Feb. 17, 1998

[54] RUN TIME CONTROL IN A CALL PROCESSING SYSTEM

[75] Inventors: Joseph Grecco, Saddle Brook; Charles Walden, Montclair, both of N.J.; Charles Manning; Paul Ranford, both of Auckland, New Zealand

[73] Assignee: Dialogic Corporation, Parsippany, N.J.

[21] Appl. No.: 306,197

[22] Filed: Sep. 14, 1994

[51] Int. Cl.⁶ ............................................. H04M 1/64
[52] U.S. Cl. ................... 379/67; 379/100; 379/207
[58] Field of Search .......................... 379/67, 88, 89, 379/100, 207, 269; 370/79, 85.13, 94.1; 395/375

[56] References Cited

U.S. PATENT DOCUMENTS

| | | | |
|---|---|---|---|
| 4,817,129 | 3/1989 | Riskin | 379/97 |
| 5,056,132 | 10/1991 | Coleman et al. | 379/88 |
| 5,287,199 | 2/1994 | Zoccolillo | 379/100 |
| 5,327,486 | 7/1994 | Wolff et al. | 379/96 |
| 5,418,844 | 5/1995 | Morrisey et al. | 379/67 |
| 5,475,737 | 12/1995 | Garner et al. | 379/89 |

*Primary Examiner*—Fan Tsang
*Attorney, Agent, or Firm*—Jeffrey I. Kaplan, Esq.

[57] ABSTRACT

A method of allowing independent call processing resources to work together in a call processing system by specifying conditions/action pairs. The technique arms specified resources to issue particular commands upon detection of the particular conditions. When the condition occurs, the armed resource issues the command and an acting resource acts upon the command. The application program no longer need be involved in mediating between resources.

13 Claims, 2 Drawing Sheets

1

RUN TIME CONTROL IN A CALL PROCESSING SYSTEM

TECHNICAL FIELD

This invention relates to telephony, and more specifically, to a method of allowing independent call processing resources to work together.

BACKGROUND OF THE INVENTION

Voice Processing Systems (VPS) have become prevalent over the past several years. Typically, such systems are based upon a personal computer (PC) platform. A plurality of voice boards are inserted into the platform, and applications software, which runs on the PC's central processing unit (CPU), is installed into the system. The voice boards perform functions such as call process monitoring, tone detection, echo cancellation, etc. The application software uses the functions to implement applications such as voice mail, fax back, automated attendant, etc. These functions and applications are well known to those of ordinary skill in this art. The applications software is that software with which the caller interacts directly.

One issue that makes development of large VPS systems somewhat difficult is the fact that there are few standards governing VPS hardware and/or software. Thus, integration of products produced by different vendors becomes cumbersome.

Specifically, lack of standardization means that when different call processing resources are utilized to process a call, the resources must either be tightly integrated with one another, or they must be managed entirely through the applications program. An example of this problem will help to clarify.

Consider a call processing application wherein a text-to-speech (TTS) converter is utilized to read aloud digital text from storage over the telephone line to a remote caller. During the time that the text is being converted and read aloud to the remote caller, the remote caller may wish to interrupt this process by pressing a predetermined touchtone digit. The application is arranged such that upon receipt of the DTMF tone corresponding to the digit, the TTS application ceases playing back the message and the application enters some other mode associated with the particular digit entered. For example, the digit might cause the application to stop playing back text through the TTS converter and to enter a record mode instead, whereby the caller can record a message.

In order for the above described scenario to take place at the VPS, a critical step is the rapid cutoff of the TTS converter. The typical scenario from the previous art is depicted in FIG. 1. DTMF detector 101 detects and decodes the particular DTMF digit entered, and transmits a DETECT message indicating the same to the application program 100, usually running on the PC's CPU. The application program 100 recognizes that the particular digit has been entered and instructs the text-to-speech converter 103 to stop playing back the message. If the application 100 and the resources 101–102 are remotely located with respect to one another, the scenario becomes even more cumbersome as the overhead associated with handshaking and communications is introduced.

It can be appreciated that the above system requires a relatively large amount of system overhead. A message must pass from the DTMF detector to the application and a second message from the application back to the TTS resource.

2

Additionally, the application, and the CPU upon which it is running, must be interrupted from any other tasks being performed. Finally, if the application is running on one computer and the resources (e.g; DTMF detector, TTS software) on another, the system experiences the relatively large delays required for the two computers to communicate (e.g.; over a network).

The other option is to provide a text-to-speech converter which is designed as part as the same system with the DTMF detector. For example, a manufacturer might provide a single circuit board which includes both the text-to-speech converter and the DTMF detector. The application could then instruct that circuit board to turn off the text-to-speech converter upon detection of the DTMF tone. The disadvantage of this system is that both the DTMF detector and the TTS must be built by the same vendor and must be built to work together. Thus, the two are really acting as one resource, which is not helpful if independent vendors have designed and built each of these resources.

SUMMARY OF THE INVENTION

The above and other problems of the prior art are overcome in accordance with the present invention (referred to herein as Routine Control which is a method of allowing independent call processing resources to work with one another. A standard interface (a Transport Layer) is provided between the application program on the PC's CPU and different call processing resources and between the call processing resources themselves. The Transport Layer included the necessary hardware and software for implementing communications between resources and between the application program and each resource. A first resource (denoted the receiving resource) is instructed to detect a particular condition, and transmit a prearranged command signal to a particular address on the transport layer, which corresponds to the address of another resource. The receiving resource, upon receipt of this instruction from the application program, is said to be "armed". The receiving resource need not know the purpose of the command it is to issue, nor anything about the resource to which it sent the command other than its address, nor is the receiving resource involved in the action taken.

A second resource, denoted the acting resource, and which resides at the transport layer address specified, receives the command from the receiving resource and acts upon that command. The acting resource need not know the source of the command. Indeed, the acting resource may simply be executing numerous commands from a queue, one of which happens to be the command from the receiving resource and others of which may be from various other sources, including the applications program or other call processing resources.

Upon detection of a particular condition (receipt of the DTMF tone) a command signal is transmitted by the receiving resource to the particular transport layer address specified. Upon receipt at that address by the acting resource of the particular command signal, the specified action (e.g.; stop TTS playback) is taken. Thus, the application running on the PC's CPU need not be involved and the resources can be independently developed as long as each follows the message protocol defined in order to place and receive messages.

DETAILED DESCRIPTION OF THE PREFERRED EMBODIMENT

Figure 1:
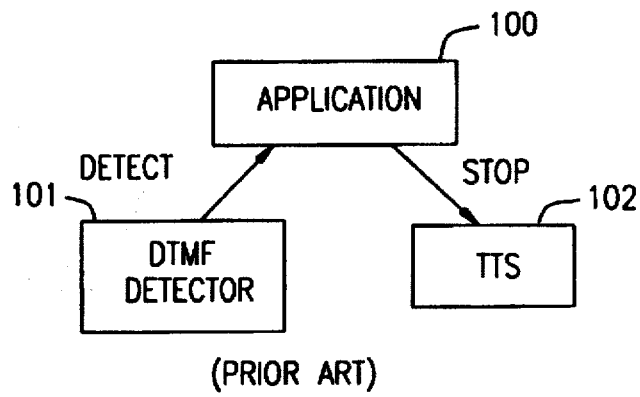
FIG. 1 is a high level conceptual representation of a prior art voice processing system.
Figure 2:
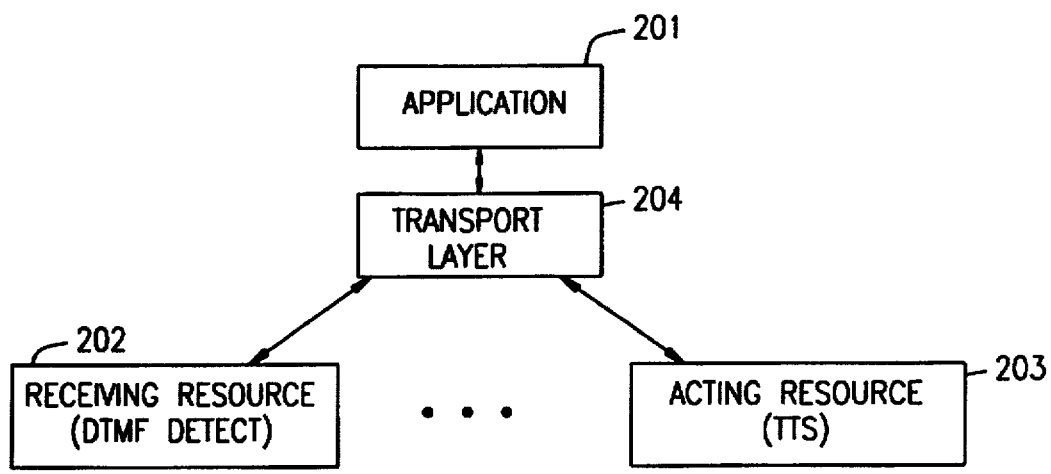
FIG. 2 is a conceptual block diagram of a call processing application and a plurality of call processing resources.

FIG. 2 shows, in conceptual form, a block diagram of several modules of a call processing system. The arrangement of FIG. 2 includes the application 201 which typically runs on the CPU, and a plurality of resources, two of which are indicated as 202 and 203. Transport Layer 204 is a transport layer for delivering messages between the application and the resources, and among the different resources. Examples of resources could be DTMF detectors, call progress monitors, TTS modules, etc.

In order to explain the operation of the present invention, we will utilize the previously described example of a TTS module playing back information and interrupted by entry of a DTMF tone. Accordingly, receiving resource 202 is indicated to be a DTMF detector in FIG. 2, and acting resource 203 is indicated to be a TTS module.

Consider an application wherein TTS data may be read from storage and played back to a remote user. However, the remote user is given the capability to "cut through" as the text is being read back. Specifically, upon detection of a particular DTMF tone, the TTS module is to stop playing back the information and to perform some other act such as enter a record mode, hang up, or any other action specified by the applications software.

In order to implement the rapid TTS converter shutoff in the above described scenario utilizing the present invention, the applications software, at some point in its operation, sends a message to receiving resource 202, which is delivered to it by transport layer 204. The message contains three parts. The first part specifies, via a vendor-independent protocol, the particular condition for the DTMF detector to recognize. The second part specifies also via a vendor-independent protocol, a command to be performed. The third part is a transport layer address (arranged by the application to be the address of the TTS resource) to which the command is to be sent. The manner in which the message is sent is determined by the design of the transport layer.

Transport Layer 204 formats the message correctly and handles communications between application 201 and any one or more resources 202 and 203. If the receiving resource 202 is connected by a network to the application 201, then transport layer 204 would include the necessary communications hardware software and protocol for communications over the network. The receiving resource, upon receipt of the message from the application program, is said to be "armed".

When the specified condition (e.g.; DTMF detection) occurs, the receiving resource outputs the specified command which is delivered by the transport layer to the acting resource. The acting resource then performs indicated command. The applications program, which runs on the CPU, need not even be aware that detection has occurred, nor need it provide any interface between the receiving resource and the acting resource.

Figure 3:
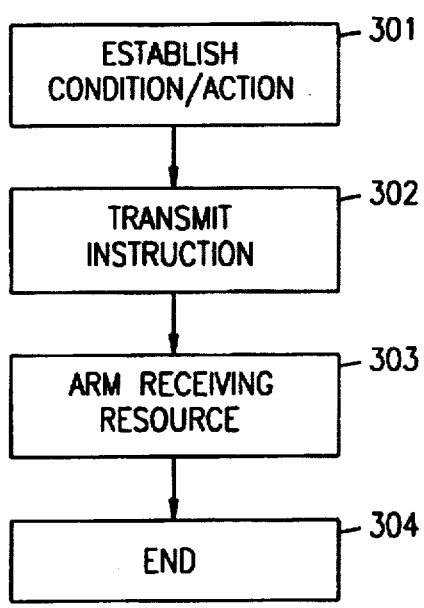
FIG. 3 is a flow chart indicating the steps to be taken to implement the present invention.

FIG. 3 shows a flow chart of how an applications program running on a CPU might implement the present invention. The first step is that the applications program creates the message containing the condition, acting resource address and action to be taken. This message is transmitted at block 302 to the transport layer 204 which delivers the message to the receiving resource at operational block 303. The system is now ready and able to act upon detection of a particular condition (i.e.; the system is armed) and the application program need not concern itself anymore with detection of the particular conditions.

A runtime control can be established to be persistent (i.e., active for the duration of a call or until canceled after its invocation). The application program establishes a persistent or transient Runtime Condition by the message sent to the receiving resource. The application cancels a persistent runtime condition by sending a different message to the receiving resource. For example, the application may decide that while playback is occurring, detection of a particular digit should result in a particular command being output by the receiving resource so that playback can be interrupted. However, after playback is complete, the receiving resource should be disarmed with respect to this condition. This is accomplished by establishing a nonpersistent runtime control.

Figure 4:
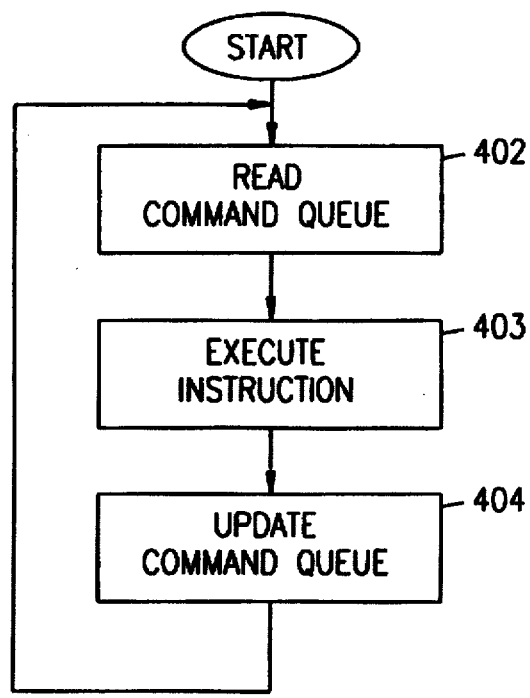
FIG. 4 is a short flow diagram indicating program flow in an acting resource.
Figure 5:
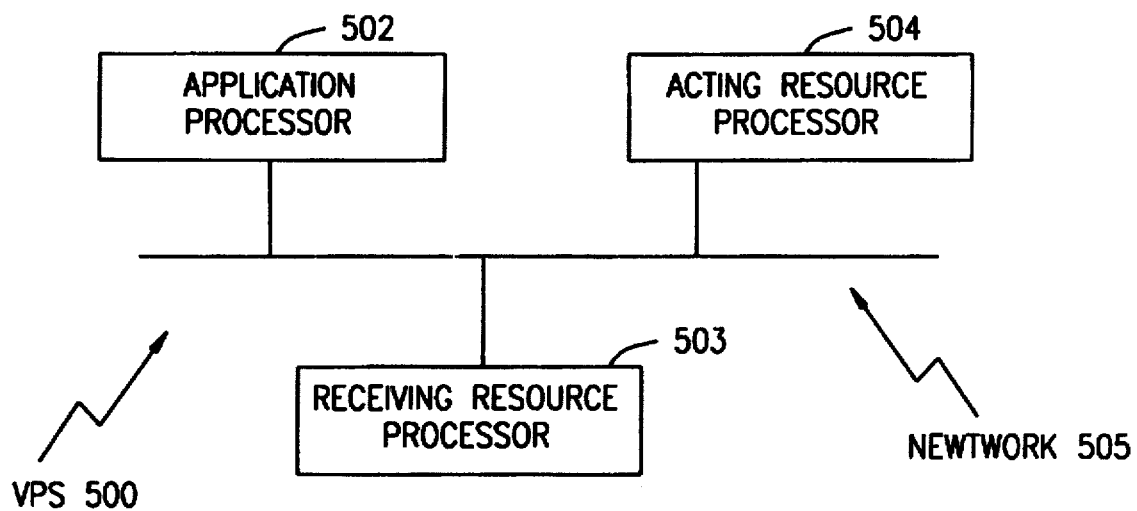
FIG. 5 is an exemplary embodiment sharing three processors, a first for executing a voice processing application, a second for executing a receiving resource, and a third for executing.

One important feature of the present invention is that the acting resources receive instructions from multiple sources which may include other resources or applications. FIG. 4 shows a short flow chart indicating the operation of any particular acting resource. At start 401, command queue 402 associated with the acting resource is read and control is transferred to operational block 403. The command is executed and control is then transferred to operational block 404. At operational block 404, the command queue is updated to delete the executed instruction and to add any new instructions which are placed in the queue by either (i) one of the call processing resources in the system or (ii) the application program. Program control then returns to operational block 402 and the loop continues. It is noted that the acting resource executes commands from other resources which themselves may be instructed to perform actions by the applications program or by other resources. The acting resource executes these commands independent of, and without knowledge of, their source. FIG. 5 shows a voice processing system 500. The voice processing system 500 includes a plurality of processors 502 to 504, interconnected by a local area network 505. The application processor 502 is intended to implement the application software for communicating with the remote user. The receiving resource 503 may be, for example, a DTMF detector. The acting resource processor 504 may be, for example, a text to speech converter. Additionally, the receiving resource may include other functionalities such as a call progress monitor, a facsimile machine, a dial pulse digit detector, or a voice recognition feature. Any or all of the aforementioned functions may be implemented as software on a receiving resource processor 503.

While the above describes the preferred embodiment of the present invention, it will be apparent to those of ordinary skill in the art that other modifications and/or additions may be readily made. Such modifications and/or additions are intended to be covered by the following claims. For example the resources may include those capable of receiving, transmitting, detecting or processing facsimile signals, call progress signals, dial pulse digits, human voice, or other signals.

We claim:

1. In a Voice Processing System comprising an applications program for interacting with a remote user and a plurality of call processing resources for exchanging messages with the applications program, at least one call processing resource arranged to detect information received from a remote user of said Voice Processing System, a method of automatically acting upon said information received from said remote user, said method comprising the steps of:

transmitting, from said applications program, prior to said information being detected, a first message to a first call processing resource, denoted as a receiving resource said first message including a particular condition in said information to be detected;

transmitting, from said applications program, prior to said information being detected, a second message to a second call processing resource, denoted as an acting resource, said second message including a particular action to be taken upon said condition being detected by said receiving resource;

generating a third message at said receiving resource when said particular condition is detected; and receiving said third message at said acting resource, and taking said particular action in response thereto.

2. The method of claim 1 wherein said first message further includes an address of said acting resource to which to deliver said third message, and the third message to be delivered.

3. The method according to claim 1 wherein said first message is sent from a first processor and wherein said receiving resource is executed on a second processor.

4. The method of claim 2 wherein said receiving resource and said acting resource execute on different processors.

5. The method of claim 3 wherein said first and second processors communicate by means of a data network.

6. The method of claim 3 wherein said receiving resource and said acting resource communicate over a data network.

7. The method according to claim 6 wherein said receiving resource is a DTMF detector and said acting resource includes means for playing back audible messages.

8. The method according to claim 7 wherein said application program and said receiving resource communicate via a data network.

9. A Voice Processing System comprising:

a first processor for executing an applications program;

a second processor for executing a receiving resource;

a third processor for executing an acting resource;

communications means for implementing communications between said applications program and said receiving resource, and between said receiving resource and said acting resource; and means at said first processor for issuing a first message to said receiving resource to arm said receiving resource such that said receiving resource will generate a second message upon occurrence of specified conditions detected from a telephone call; and means at said first processor for issuing a third message to said acting resource, said third message specifying a particular action to be taken by said acting resource upon receipt of said second message;

means at said acting resource for receiving said second message from said receiving resource and performing an action associated with said second message, said second message being transmitted directly from said second processor to said third processor and not via said first processor.

10. The Voice Processing System of claim 9 wherein said receiving resource comprises a call progress monitor.

11. The Voice Processing System of claim 9 wherein said receiving resource includes means for receiving and recognizing facsimile signals.

12. The Voice Processing System of claim 9 wherein said receiving resource includes means for detecting dial pulse signals.

13. The Voice Processing System of claim 9 wherein said receiving resource includes means for receiving and processing voice.

* * * * *